Dec. 2, 1969  G. W. LUCKEY ET AL  3,482,092
ROTATING TURRET ELECTRODE HOLDER
Filed April 27, 1967  2 Sheets-Sheet 1

INVENTORS
GEORGE W. LUCKEY,
FRANCIS A. MILLER, JR.

BY

ATTORNEY

United States Patent Office 3,482,092
Patented Dec. 2, 1969

3,482,092
ROTATING TURRET ELECTRODE HOLDER
George W. Luckey and Francis A. Miller, Jr., Richmond, Va., assignors to E. I. du Pont de Nemours and Company, Wilmington, Del., a corporation of Delaware
Filed Apr. 27, 1967, Ser. No. 634,355
Int. Cl. H01j 37/26
U.S. Cl. 250—49.5                    4 Claims

ABSTRACT OF THE DISCLOSURE

Parallel rotatable turrets in which the roll electrodes are mounted providing for easy threading of the film through the roll and companionate electrodes of an electrical discharge treating apparatus and for the accurate positioning of the roll electrodes opposite the companionate electrodes by rotating the turrets approximately 180°.

BACKGROUND OF THE INVENTION

This invention is related to the electrical discharge treatment of webs and more particularly to the electrical discharge treatment of polymeric films.

In the electrical discharge treatment of web structures to improve the adherability of their surfaces a common difficulty is threading such structures through the narrow space between the electrodes. The problem becomes even more complicated when there are successive treating stations such as for treating two surfaces of the web structure or for treating the exposed surfaces of a two layered laminate of such web structures. Additionally the clearance between the electrodes must be very carefully controlled during the treatments. Various arrangements have been proposed for retracting one of the electrodes for thread-up purposes or for by-passing the treating station when treatment of a film is not desired. A typical example of this technique is described in U.S. Patent 2,882,412. With most arrangements available up to now it is difficult to maintain the desired clearance between the electrodes during treatment due to the instability introduced by the retractability of the electrodes. Furthermore, the opening they provide even in the retracted thread-up position is minimal, making it difficult to thread the film without inadvertently contacting one or the other of the electrodes and thereby causing the film to be smeared or marked by the hot electrodes.

SUMMARY OF THE INVENTION

According to the present invention there is provided an apparatus for the electrical discharge treatment of a running web comprising at least one pair of rotatable turrets, coparallel approximately diametrically opposed roll electrodes journaled at their ends in the confronting faces of the turrets, companionate electrodes disposed peripherally adjacent the roll electrodes when the turrets are rotated to index the roll electrodes with diameters into generally coplanar relationship with and a controllably spaced distance from the companionate electrodes, and guide means directing the running web through the opening between the roll electrodes when free of engagement with the roll electrodes.

The invention will be described in detail by reference to the drawings.

DESCRIPTION OF THE PREFERRED EMBODIMENT

Figure 1:
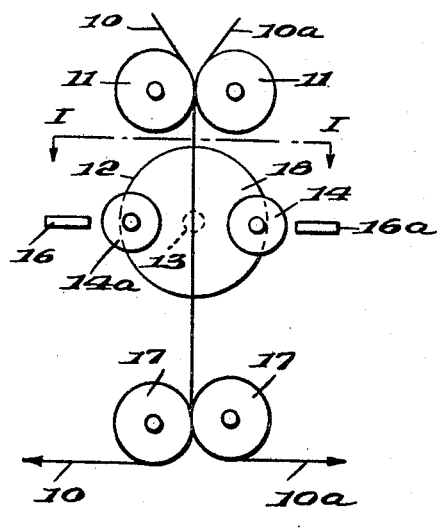
FIGURE 1 is a schematic view of the preferred embodiment of the present invention in its thread-up or by-pass position with the first turret removed.
Figure 2:
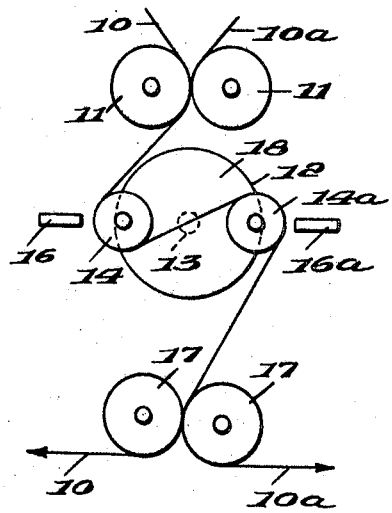
FIGURE 2 is a schematic view of the preferred embodiment of the present invention in its operating or treating position with the first turret removed.
Figure 3:
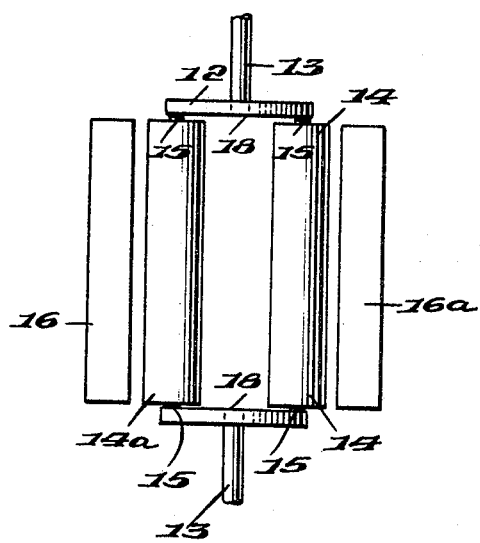
FIGURE 3 is a sectional view taken substantially along line I—I of FIGURE 1 without showing the films and the take-up rolls.

Referring now to the drawings, FIGURES 1, 2 and 3 show an apparatus for continuous electrical discharge treatment comprising polymeric films 10 and 10a and including feeding rolls 11 and a pair of rotatable turrets 12. The turrets 12 are rotated by shafts 13 driven by a motor not shown. Two coparallel diametrically opposed roll electrodes 14 and 14a are journaled at their ends in bearings 15 in the confronting faces 18 of the turrets 12. Two companionate electrodes 16 and 16a are mounted in a securely fixed essentially nonmovable position diametrically opposite one another referred to the turrets. By securely fixed essentially nonmovable position it is mean that the companionate electrodes are not retractable such as by means of a pivotal arrangement to provide more room for threading. The only motion they are capable of is for the minor adjustment of the clearance between themselves and the roll electrodes. The companionate electrodes are peripherally adjacent to the roll electrodes 14 and 14a when the turrets are rotated to index the roll electrodes with diameters into general coplanar relationship with and a controllably spaced distance from the companionate electrodes 16 and 16a. Take-up rolls 17 serve to withdraw the polymeric films 10 and 10a.

This apparatus is particularly useful for the treatment of two polymeric films simultaneously or for the treatment of both surfaces of a single polymeric film. In both instances treatment at multiple stations is necessary. Threading the polymeric films 10 and 10a is easily and quickly accomplished (see FIGURE 1). The films are supplied to the feeding rolls 11 which will guide them between the two roll electrodes 14 and 14a to the take-up rolls 17 in a vertical downward path. The roll electrodes are positioned 180° apart, that is diametrically opposed to one another referred to the turrets and their axes of rotation lie in a plane perpendicular to that of the films. This configuration of the apparatus is also its by-pass position in which the films can be conveniently passed through the apparatus without treatment.

To shift to the operating or treating position (refer to FIGURE 2) the turrets 12 are rotated by motor driven shaft 13 through 180° counterclockwise to contact the films and place them into the preselected spatial relationship opposing companionate electrodes 16 and 16a. As can be seen in the operating position roll electrode 14 will face its companionate electrode 16 while roll electrode 14a will be adjacent to companionate electrode 16a. Thus electrodes 14 and 16 will treat the exposed surface of film 10 and electrodes 14a and 16a will treat the exposed surface of film 10a.

Whereas the above description represents the preferred embodiment numerous variations can be made therein without departing from the spirit and scope of the invention. For example, the 180° apart position of the roll electrodes 14 and 14a on the turrets 12 in the thread-up or by-pass position (FIGURE 1) is preferred because it provides the maximum clearance for the passage of the films. However, this angle can be more or less, depending on the size of the diameter of the rolls and the turrets, as long as the clearance between the roll electrodes is kept sufficiently wide for unobstructed threading. Similarly, the angle the turrets are rotated through to shift to the operating position can be more or less than the preferred 180° shown in FIGURE 2. The controlling factor is that the films be wrapped around the roll electrodes sufficiently to provide firm contact thereby pressing out the air from between the two films and preventing undesirable back treatment. This is accomplished if the films are wrapped around at least one fourth of the circumference of the roll electrodes. Obviously, the turrets can be rotated either clockwise or counterclockwise depending on which pair of electrodes is to comprise the first treating station. While in the preferred embodiment, the companionate electrodes are also 180° apart; diametrically opposite one another, they can be located anywhere as long as they do not obstruct the movement of the films or the roll electrodes. Naturally, the position of the companionate electrodes is dependent on that of the roll electrodes as well as one the direction and extent of the turret rotation since at least in the operating or treating position the companionate electrodes have to lie peripherally adjacent to the roll electrodes and at a controllably spaced distance therefrom.

As an additional variation one of the turrets could be omitted when the size of the roll electrodes permits it. In this embodiment the roll electrodes would be journaled only at one end in a turret which would support and rotate them between the various positions. Of course, this type of arrangement would be suitable only for the treatment of webs of limited width.

The respective pairs of electrodes may be connected to the same power source or separate power sources can be provided for each pair of electrodes. Optionally, a dielectric cover may be used on the roll electrode surfaces. The film path can be selected as desired, downward, as shown, or upward, horizontal, etc.

Figure 4:
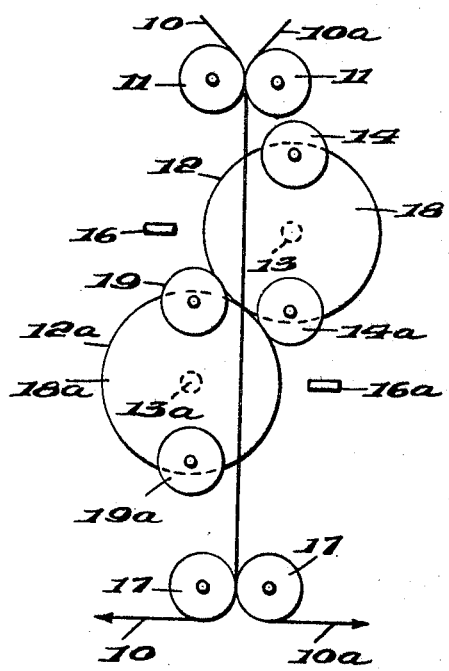
FIGURE 4 is a schematic view of an alternative embodiment of the present invention in its thread-up or by-pass position with the first turrets removed.
Figure 5:
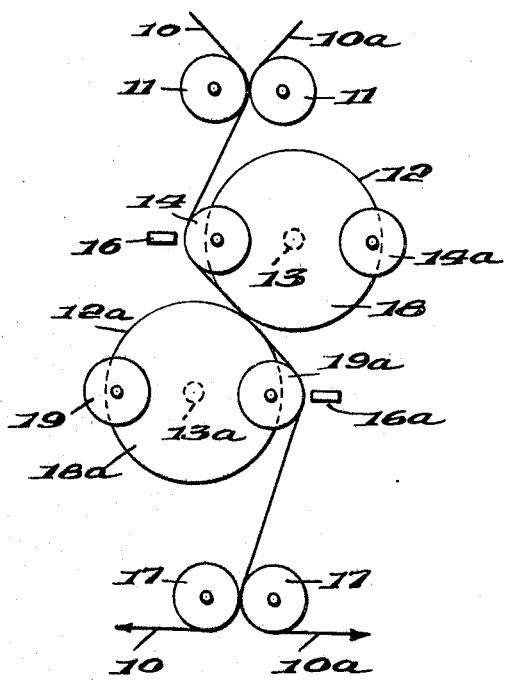
FIGURE 5 is a schematic view of the alternative embodiment of the present invention in its operating or treating position with the first turrets removed.

In applications where the roll electrodes require frequent maintenance, such as cleaning, replacement of the dielectric cover, etc., it is advantageous to have a spare roll electrode readily available to prevent lengthy shutdowns. FIGURES 4 and 5 depict such an embodiment of the present invention. The apparatus comprises polymeric films 10 and 10a and includes feeding rolls 11 and two pairs of rotatable turrets 12 and 12a. The turrets are rotated by shafts 13 and 13a driven by a motor not shown. Four coparallel diametrically opposed roll electrodes 14, 14a, 19 and 19a are journaled at their ends in bearings (not shown) in the confronting faces 18 and 18a of the turrets 12 and 12a. Two companionate electrodes 16 and 16a are mounted in a securely fixed essentially nonmovable position peripherally adjacent to the roll electrodes 14, 14a, 19 and 19a when the turrets are rotated to index the roll electrodes with diameters into generally coplanar relationship with and a controllably spaced distance from the companionate electrodes 16 and 16a. Take-up rolls 17 serve to withdraw the polymeric films 10 and 10a.

Threading the polymeric films 10 and 10a is easily and quickly accomplished (see FIGURE 4). The films are supplied to the feeding rolls 11 which will guide them through the clearance between the two sets of roll electrodes 14/14a and 19/19a, respectively, to the take-up rolls 17 in a vertical downward path. The roll electrodes are positioned 180° apart, that is diametrically opposed to one another referred to the turrets and their axes of rotation lie in a plane perpendicular to that of the films. This configuration of the apparatus is also its by-pass position in which the films can be conveniently passed through the apparatus without treatment.

To shift to the operating or treating position (refer to FIGURE 5) the turrets 12 and 12a are rotated by motor driven shaft 13 through 180° counterclockwise to contact the films and place them into the preselected spatial relationship opposing companionate electrodes 16 and 16a. When one of the roll electrodes requires maintenance, for example, roll electrode 14, the turrets 12 are rotated through 180° placing the fresh roll electrode 14a in contact with the film and adjacent to companionate electrode 16. Treatment of the film can thus continue immediately between roll electrode 14a and companionate electrode 16 while the required maintenance operation is performed simultaneously on roll electrode 14.

This type of apparatus is applicable for the treatment of various polymer films illustrative of which are polyethylene, polypropylene, polyethylene terephthalate and other polyesters, regenerated cellulose, and polyethylene coated paper, as well as woven and non-woven types of web structures, for example, woven polymeric fabrics, sheet foam structures, etc.

The primary advantage of the instant invention is the greater ease of thread-up by omitting the tortuous threading of web structures through the narrow clearance between successive pairs of electrodes. Furthermore, spreading the rotating roll electrodes, as is done in the thread-up or by-pass position, there is less tendency for the webs to contact the hot electrodes and be smeared or marked by them. An additional advantage results from the use of securely fixed companionate electrodes in that the critical clearance between the electrodes can be maintained with more precision.

What is claimed is:

1. An electrical discharge treatment apparatus comprising in combination
    a running web,
    at least one pair of rotatable turrets,
    coparallel approximately diametrically opposed roll electrodes journaled at their ends in the confronting faces of said turrets,
    companionate electrodes disposed peripherally adjacent said roll electrodes when said turrets are rotated to index said roll electrodes with diameters into generally coplanar relationship with and a controllably spaced distance from said companionate electrodes, and
    guide means directing said running web through the opening between said roll electrodes when free of engagement with said roll electrodes.

2. An electrical discharge treatment apparatus comprising in combination
    a running web,
    a pair of rotatable turrets,
    two coparallel approximately diametrically opposed roll electrodes journaled at their ends in the confronting faces of said turrets,
    companionate electrodes disposed approximately diametrically opposite one another referred to said turrets and peripherally adjacent said roll electrodes when said turrets are rotated to index said roll electrodes with diameters into generally coplanar relationship with and a controllably spaced distance from said companionate electrodes, and
    guide means directing said running web generally diametrically of said turrets when free of engagement with said roll electrodes.

3. The apparatus of claim 1 wherein said running web is at least a single layer of a polymeric film.

4. The apparatus of claim 1 wherein said companionate electrodes are mounted in a securely fixed essentially nonmovable position approximately diametrically opposite one another referred to said turrets.

References Cited

UNITED STATES PATENTS

| | | | |
|---|---|---|---|
| 2,685,417 | 8/1954 | Bartelson | 242—75.3 |
| 3,067,119 | 12/1963 | Ramaika | 250—49.5 |

FOREIGN PATENTS

| | | |
|---|---|---|
| 950,987 | 10/1956 | Germany. |
| 1,154,098 | 4/1938 | France. |

RALPH G. NILSON, Primary Examiner

S. C. SHEAR, Assistant Examiner

U.S. Cl. X.R.

250—65